July 26, 1966     L. G. SOLGERE     3,263,164
ELECTRICAL GROUND AND POLARITY TESTER WITH THERMALLY
CONTROLLED SWITCH MEANS
Filed Oct. 10, 1961

THERMAL SWITCH
THERMAL ELEMENT

INVENTOR.
Louis G. Solgere
BY
ATTORNEYS

United States Patent Office 3,263,164
Patented July 26, 1966

3,263,164
ELECTRICAL GROUND AND POLARITY TESTER WITH THERMALLY CONTROLLED SWITCH MEANS
Louis G. Solgere, 1410 Weyler Ave., Louisville 15, Ky.
Filed Oct. 10, 1961, Ser. No. 144,273
2 Claims. (Cl. 324—51)

The invention described herein may be manufactured and used by or for the Government for governmental purposes without the payment of any royalty thereon.

This invention relates to improvements in portable electrical testers for three-wire receptacles or connectors, in grounded neutral circuits designed in accordance with the requirements of the National Electric Code, for determining whether an adequate equipment ground is present and whether proper connection of the identified neutral conductor to the neutral terminal on the receptacle or connector has been made in accordance with the National Electric Code. While it is possible to make any of the above tests by use of a voltmeter or voltage indicating device in conjunction with a load bank operated and evaluated by trained technical personnel, the present tester enables inexperienced personnel who can follow simple instructions to quickly make such tests where the grounded neutral circuits have been designed to conform with the National Electric Code.

The tester includes a three terminal plug connected by cable to the tester circuit. The plug is inserted into the receptacle or connector to be tested, which receptacle supplies the power for the tester, and by the manipulation of two switches on the tester the electrical condition of the power receptacle being tested may be determined. One of the switches permits selection and connection of circuits including either the neutral or phase and the ground terminals of the receptacle being tested to the tester circuit. Another switch is a bimetal thermal switch, which in the closed condition connects a bank of resistors across the particular circuit selected by the first switch. Imposition of this resistor load across the circuit under test will result in a four ampere current flowing in the circuit tested for eight or ten seconds. If at the end of ten seconds the thermal switch trips due to current flowing through the heater element thereof, it indicates that the ground is in operation and that the phase wire is connected to the proper terminal of the receptacle or connector being tested. If the thermal switch does not trip, it indicates either that the ground circuit is open or that the polarization of the phase and neutral wires is reversed.

Failure in operation or prolonged delay in tripping of the thermal switch (beyond ten seconds) after applying the load resistors across a circuit can also indicate faulty insulating conditions and poor electrical connections as well as open or high resistance connections. The tester may be used on either alternating or direct current grounded neutral circuits designed in accordance with the National Electric Code. The cable from the tester is connected to the tester plug in the conventional manner, i.e., the "hot" or phase wire is connected to the brass terminal, the neutral wire is connected to the silver terminal and the ground wire is connected to the green terminal.

The primary object of the instant device therefor is to provide a tester which can be used by nontechnical personnel to determine whether a three-wire electrically energized power receptacle or connector, in a grounded neutral circuit, is correctly wired, i.e., proper phase connections, proper ground connection, circuitry continuity, adequate insulation and good electrical connection.

Further objects and advantages will become apparent from the accompanying description and drawings in which.

In the drawings, like reference characters represent like parts of the tester circuit.

Although the testing equipment is shown here in a particular form to test household, domestic lighting and power grounded neutral circuits, it may be adapted by modification within the scope of the invention for use with other types of electrical circuits.

Figure 1:
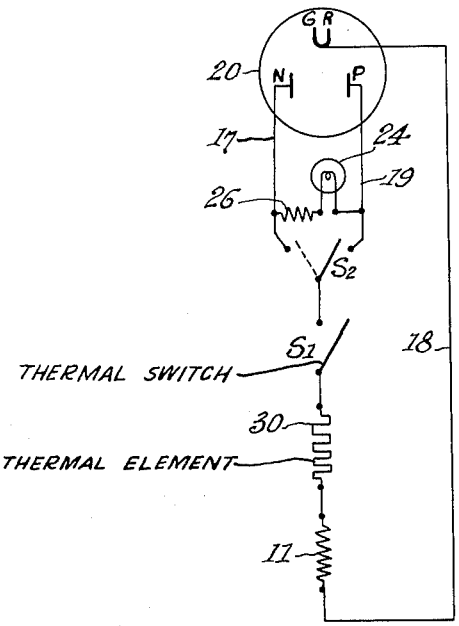
FIG. 1 represents a single line schematic drawing of the tester.

FIG. 1 is a simplified version of the test circuit including a three-wire polarized plug 20 to be plugged into a corresponding three-wire cooperating polarized circuit, receptacle or connector of the circuit under test.

Ground terminal GR, of plug 20, is connected by lead 18 in series with resistance 11, thermal heater element 30, switch $S_1$ and switch $S_2$. Negative terminal N is connected by lead 17 to resistance 26, switch $S_2$, switch $S_1$, thermal heater element 30 and resistance member 11 and by lead 18 in series with ground terminal GR. Positive terminal P is connected by lead 19 to indicator 24, switches $S_2$ and $S_1$, thermal element 30, resistance 11 and by lead 18 to ground terminal GR. Indicator 24 may be a neon bulb, meter or other suitable indicator which is connected in series with resistance 26 across leads 17 and 19 and will light or be activated to show that the circuit is energized.

During operation of the circuit of FIG. 1, switch $S_2$ may be selectively closed or connected to either, lead 19 of positive terminal P or lead 17 of negative terminal N, after which the chosen terminal may be connected by switch $S_1$ to ground terminal GR of plug 20 through lead 18 to indicate whether the portion of the circuit under test is properly grounded.

Figure 2:
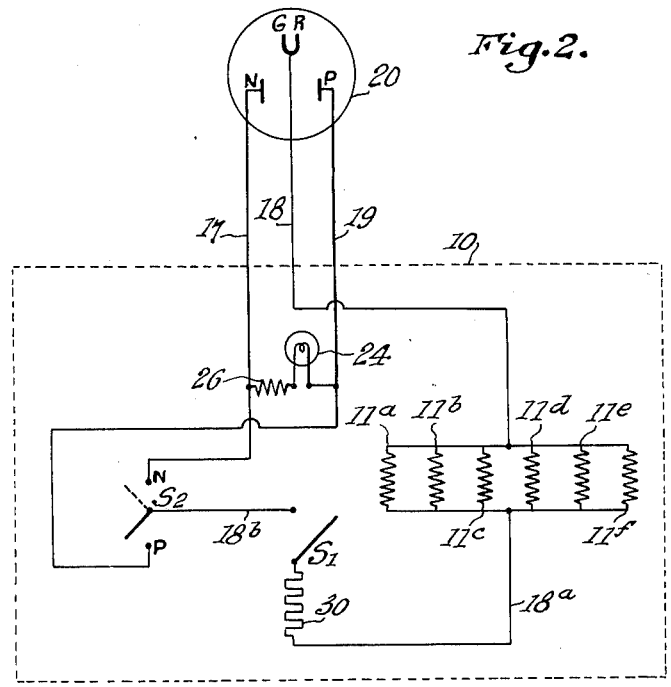
FIG. 2 represents the complete circuit of the tester.

The circuit shown in FIG. 2 which may be housed in a container shown generally by 10, has the same configuration as that shown in FIG. 1 except that loading resistance 11 of FIG. 1 is replaced by a plurality of loading resistors, 11a–11f, connected in parallel but serially connected between the ground terminal of the conector plug and thermal element 30. The ersistors, 11 and 11a–11f represent a load which may be imposed between either side of the line, "N" or "P," and ground. The switch $S_1$ may be a bimetallic thermal motor switch which includes the thermal element 30. When used to test 15 ampere, 125 volt supply circuits the bimetallic thermal motor switch element 30 has a rating of 0.66 ampere and the six paralleled resistors, 11a–11f are each 200 ohms and 50 watt rating. Ratings for these components for testing circuits of different potentials may be determined by methods well known to those skilled in the art.

When it is desired to test energized three-wire receptacles or connectors for adequate equipment ground or proper connections, the plug 20 is inserted into an energized receptacle or connector. If the receptacle or connector is energized, the indicator 24 will light; if it is a lamp, or if a meter, it will be activated. The switch $S_1$ is closed and the switch $S_2$ is thrown to the "Phase" or "P" position. With the values above used in the tester and testing a 125 volt, 15 ampere circuit, this will permit approximately four amperes of current to flow between the phase wire and equipment ground for eight to ten seconds. If at the end of ten seconds the switch $S_1$ trips due to current flowing through the thermal element 30, it indicates that the ground is in operation and the phase wire is connected to the proper terminal of the receptacle or connector and the tester having served its purpose, no further test need be made. If the switch S does not trip, it indicates either that the equipment ground circuit is open or that the polarization or the phase and neutral wires have been reversed. For testing the other side of the line or neutral side, the switch $S_2$ is thrown to the "N" terminal or position and the switch $S_1$ is left in the "on" position. If the switch $S_1$ trips in approximately ten seconds, it indicates that the equipment ground is properly connected but the connection of the phase and neutral wires have been reversed. If the switch $S_1$ does not trip, it indicates that the equipment ground is not complete. If switch $S_1$ requires more than ten seconds to trip with switch $S_2$ in either position, "P" or "N," it indicates a high resistance and consequently low current flow due to the imposed load 11 in the equipment ground, which is undesirable. It can be seen that by using the tester in the manner described it will indicate whether or not the equipment ground is complete and, if so, whether the phase line is properly connected.

While the tester has been illustrated for testing energized three-wire electrical convenience receptacles, it is to be understood, that this tester is not to be necessarily limited to such receptacles, but may be used with multiconductor receptacles (for instance a commercial plug and receptacle similar to the well known Jones plug and receptacle) without departing from the scope and teaching of the invention.

While one embodiment of the tester has been described, it is to be understood, that the above-described arrangements are simply illustrative of the application of the principles of the invention and numerous other arrangements may be made by those skilled in the art which will embody the principles of the invention and fall within the spirit and scope thereof.

I claim:

1. An electrical tester for testing continuity and polarity of connections to an energized electrical convenience outlet receptacle in an unloaded condition in a grounded neutral circuit comprising in combination, a test circuit, a three terminal cable terminating in a plug having three prongs, each prong being adapted to be connected to its respective terminal of the energized receptacle, said plug being adapted to cooperatively connect the test circuit of the tester to the energized receptacle; a first switch means in said test circuit for selectively and alternatively separately connecting the negative and positive lead of the receptacle through the plug and the test circuit to the ground terminal of the energized receptacle under test; indicator means in said test circuit connected across a pair of prongs of said plug corresponding to the positive and negative leads of the energized receptacle for determining whether the receptacle is energized and thermally controlled timed switch means and resistive load means serially connected in said test circuit between the prong adapted to be connected to the ground terminal of the energized receptacle and said first switch means for determining energization and relative phase connections of the receptacle and resistivity characteristics of circuits connected to the receptacle, said thermal switch means breaking continuity of the test circuit by operating in a predetermined time responsive to current flow determined by said resistive load.

2. An electrical circuit tester for testing continuity and polarity of an unloaded electrical convenience outlet receptacle in a grounded neutral circuit comprising connector means including a plurality of terminal members, indicating means connected between a pair of said plurality of terminal members, a first switch means for selective and alternate separate connection to each of one of said pair of terminal members, thermally controlled timed switch means for breaking circuit continuity when energized to demonstrate proper ground and phase connection and electrical circuit loading means serially connected between said first switch means and a terminal member on said connector means other than said pair of terminal members whereby upon connection of said connector means to an energized electrical receptacle accommodating said terminal members said thermal switch breaks circuit continuity by operating in predetermined time responsive to current flow determined by said resistive load and the phase relation of conductors connected to said energized receptacle and continuity thereof may be determined.

References Cited by the Examiner

UNITED STATES PATENTS

| 2,598,775 | 6/1952 | Fischer | 324—66 |
| 2,641,633 | 6/1953 | Hosford | 324—52 |
| 2,705,773 | 4/1955 | Ward | 324—73 |
| 2,789,236 | 4/1957 | Cummings | 324—51 X |

FOREIGN PATENTS

| 767,104 | 1/1957 | Great Britain. |
| 807,544 | 1/1959 | Great Britain. |

WALTER L. CARLSON, *Primary Examiner.*

G. S. KINDNESS, G. R. STRECKER,

*Assistant Examiners.*